(12) United States Patent
Koskinen

(10) Patent No.: US 11,695,520 B2
(45) Date of Patent: *Jul. 4, 2023

(54) METHOD AND APPARATUS FOR IMPLEMENTING EFFICIENT SWITCHING ON A SPLIT BEARER

(71) Applicant: NOKIA SOLUTIONS AND NETWORKS OY, Espoo (FI)

(72) Inventor: Henri Markus Koskinen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 44 days.

This patent is subject to a terminal disclaimer.

(21) Appl. No.: 17/342,014

(22) Filed: Jun. 8, 2021

(65) Prior Publication Data

US 2021/0297203 A1  Sep. 23, 2021

Related U.S. Application Data

(63) Continuation of application No. 16/327,666, filed as application No. PCT/EP2017/063900 on Jun. 8, 2017, now Pat. No. 11,057,167.

(Continued)

(51) Int. Cl.
*H04L 5/00* (2006.01)

(52) U.S. Cl.
CPC .................. *H04L 5/001* (2013.01)

(58) Field of Classification Search
CPC ...... H04L 5/001; H04W 16/32; H04W 28/10; H04W 28/16; H04W 36/04; H04W 76/02;

(Continued)

(56) References Cited

U.S. PATENT DOCUMENTS 9,713,044 B2  7/2017  Yamada
9,756,531 B2  9/2017  Park
(Continued)

FOREIGN PATENT DOCUMENTS

| WO | 2015/171053 A1 | 11/2015 |
| WO | 2016/006969 A1 | 1/2016 |
| WO | 2016/029962 A1 | 3/2016 |

OTHER PUBLICATIONS

3GPP TS 36.300, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), V12.6.0 (Jun. 2015), 254 pages, Jun. 2015.*

(Continued)

*Primary Examiner* — Frank Duong
(74) *Attorney, Agent, or Firm* — Squire Patton Boggs (US) LLP

(57) ABSTRACT

A method and apparatus may include configuring a split bearer. The split bearer is configured with a first data path between a user equipment and a first network node, and the split bearer is also configured with a second data path between the user equipment and a second network node. The split bearer is configured for a switching operation. The switching operation includes an operation where data transmission is restricted to be towards only one of the first data path and the second data path. The method also includes first transmitting on the split bearer towards the first data path. The method also includes performing the switching operation. The transmitting towards the first data path is switched to transmitting towards the second data path. The method also includes second transmitting on the split bearer towards the second data path.

15 Claims, 7 Drawing Sheets

Related U.S. Application Data

(60) Provisional application No. 62/378,070, filed on Aug. 22, 2016.

(58) Field of Classification Search
CPC ..... H04W 76/04; H04W 76/06; H04W 76/15; H04W 76/25; H04W 76/27; H04W 84/04; H04W 76/19; H04W 76/20; H04W 76/22; H04W 76/32; H04W 76/36; H04W 84/045
See application file for complete search history.

(56) References Cited

U.S. PATENT DOCUMENTS

| | | |
|---|---|---|
| 9,867,096 B2 | 1/2018 | Susitaival |
| 10,045,360 B2 | 8/2018 | Sang |
| 2014/0362829 A1 | 12/2014 | Kazmi |
| 2015/0085800 A1 | 3/2015 | Sivanesan |
| 2015/0098322 A1 | 4/2015 | Chen |
| 2015/0133122 A1 | 5/2015 | Chen |
| 2015/0215945 A1 | 7/2015 | Hsu |
| 2015/0245349 A1 | 8/2015 | Jha |
| 2015/0358838 A1 | 12/2015 | Wei |
| 2016/0295442 A1 | 10/2016 | Virtej |
| 2017/0295517 A1* | 10/2017 | Nguyen ............... H04W 8/22 |
| 2018/0092146 A1 | 3/2018 | Hong |
| 2019/0098640 A1* | 3/2019 | Holakouei ............ H04L 5/0032 |

OTHER PUBLICATIONS

International Search Report and Written Opinion dated Sep. 6, 2017 corresponding to International Patent Application No. PCT/EP2017/063900.

European Office Aciton issued in corresponding European Patent Application No. 17 733 375.4-1205 dated Mar. 1, 2021.

CATT, "Discussion on Scheduling Issue for UL Split Bearer in eLWA", 3GPP TSG RAN WG2 Meeting #94, Nanjing, China, May 23-27, 2016, R2-163376, 3 pages, May 2016.

Nokia, Alcatel-Lucent Shanghai Bell, Dual Connectivity for LTE-NR Tight Interworking, 3GPP TSG-RAN WG2 Meeting #94, 2 pages, May 2016.

Da Silva et al., Tight Integration of new 5G air interface and LTE to fulfill 5G requirements, IEEE, 5 pages, 2015.

* cited by examiner

METHOD AND APPARATUS FOR IMPLEMENTING EFFICIENT SWITCHING ON A SPLIT BEARER

CROSS-REFERENCE TO RELATED APPLICATIONS

This application is a continuation application of U.S. patent application Ser. No. 16/327,666, filed on Feb. 22, 2019, which was a 371 U.S. National Stage entry of International Patent Application No. PCT/EP2017/063900, filed on Jun. 8, 2017, which is related to and claims the benefit and priority of U.S. Provisional Patent Application No. 62/378,070, filed on Aug. 22, 2016. The disclosures of these prior applications are hereby incorporated by reference in their entireties.

BACKGROUND

Field

Certain embodiments of the present invention relate to implementing efficient switching on a split bearer.

Description of the Related Art

Long-term Evolution (LTE) is a standard for wireless communication that seeks to provide improved speed and capacity for wireless communications by using new modulation/signal processing techniques. The standard was proposed by the 3$^{rd}$ Generation Partnership Project (3GPP), and is based upon previous network technologies. Since its inception, LTE has seen extensive deployment in a wide variety of contexts involving the communication of data.

SUMMARY

According to a first embodiment, a method can include configuring a split bearer. The split bearer is configured with a first data path between a user equipment and a first network node. The split bearer is also configured with a second data path between the user equipment and a second network node. The split bearer is configured for a switching operation. The switching operation comprises an operation where data transmission is restricted to be towards only one of the first data path and the second data path. The method can also include first transmitting on the split bearer towards the first data path. The method can also include performing the switching operation. The transmitting towards the first data path is switched to transmitting towards the second data path. The method can also include second transmitting on the split bearer towards the second data path.

In the method of the first embodiment, the first transmitting and the second transmitting comprises transmitting protocol data units, each protocol data unit is transmitted with a corresponding sequence number.

In the method of the first embodiment, the first transmitting and the second transmitting comprises transmitting Packet Data Convergence Protocol transmissions.

In the method of the first embodiment, when the switching operation is performed, protocol data units are retransmitted, the retransmitted protocol data units being protocol data units for which a confirmation of successful transmission was not obtained.

In the method of the first embodiment, the second transmitting includes transmitting a corresponding switch counter value, and the switch counter value is incremented each time the switching operation is performed.

According to a second embodiment, an apparatus can include at least one processor. The apparatus can also include at least one memory including computer program code. The at least one memory and the computer program code can be configured, with the at least one processor, to cause the apparatus at least to configure a split bearer. The split bearer is configured with a first data path between a user equipment and a first network node, and the split bearer is also configured with a second data path between the user equipment and a second network node. The split bearer is configured for a switching operation. The switching operation comprises an operation where data transmission is restricted to be towards only one of the first data path and the second data path. The apparatus can also be caused to first transmit on the split bearer towards the first data path. The apparatus can also be caused to perform the switching operation. The transmitting towards the first data path is switched to transmitting towards the second data path. The apparatus can also be caused to second transmit on the split bearer towards the second data path.

In the apparatus of the second embodiment, the first transmitting and the second transmitting comprises transmitting protocol data units, each protocol data unit is transmitted with a corresponding sequence number.

In the apparatus of the second embodiment, the first transmitting and the second transmitting comprises transmitting Packet Data Convergence Protocol transmissions.

In the apparatus of the second embodiment, when the switching operation is performed, protocol data units are retransmitted, the retransmitted protocol data units being protocol data units for which a confirmation of successful transmission was not obtained.

In the apparatus of the second embodiment, the second transmitting includes transmitting a corresponding switch counter value, and the switch counter value is incremented each time the switching operation is performed.

According to a third embodiment, a computer program product can be embodied on a non-transitory computer readable medium, the computer program product configured to control a processor to perform a method according to the first embodiment.

According to a fourth embodiment, a method can include configuring a split bearer. The split bearer is configured with a first data path between a user equipment and a first network node. The split bearer is also configured with a second data path between the user equipment and a second network node. The split bearer is configured for a switching operation. The switching operation comprises an operation where data transmission is restricted to be towards only one of the first data path and the second data path. The method can also include receiving transmissions on one of the first data path and the second data path. Transmissions are transmitted towards the other of the first data path and the second data path after the switching operation.

In the method of the fourth embodiment, the receiving the transmissions comprises receiving protocol data units, each protocol data unit is received with a corresponding sequence number.

In the method of the fourth embodiment, the receiving the transmissions comprises receiving Packet Data Convergence Protocol transmissions.

In the method of the fourth embodiment, when the switching operation is performed, protocol data units are retransmitted, the retransmitted protocol data units being protocol data units for which a confirmation of successful transmission was not obtained.

In the method of the fourth embodiment, the receiving comprises receiving protocol data units, each protocol data unit is associated with a corresponding switch counter value.

According to a fifth embodiment, an apparatus can include at least one processor. The apparatus can also include at least one memory including computer program code. The at least one memory and the computer program code can be configured, with the at least one processor, to cause the apparatus at least to configure a split bearer. The split bearer is configured with a first data path between a user equipment and a first network node. The split bearer is also configured with a second data path between the user equipment and a second network node, the split bearer is configured for a switching operation. The switching operation comprises an operation where data transmission is restricted to be towards only one of the first data path and the second data path. The apparatus can also be caused to receive transmissions on one of the first data path and the second data path. Transmissions are transmitted towards the other of the first data path and the second data path after the switching operation.

In the apparatus of the fifth embodiment, the receiving the transmissions comprises receiving protocol data units, each protocol data unit is received with a corresponding sequence number.

In the apparatus of the fifth embodiment, the receiving the transmissions comprises receiving Packet Data Convergence Protocol transmissions.

In the apparatus of the fifth embodiment, when the switching operation is performed, protocol data units are retransmitted, the retransmitted protocol data units being protocol data units for which a confirmation of successful transmission was not obtained.

In the apparatus of the fifth embodiment, the receiving comprises receiving protocol data units, each protocol data unit is associated with a corresponding switch counter value.

According to a sixth embodiment, a computer program product can be embodied on a non-transitory computer readable medium, the computer program product configured to control a processor to perform a method according to the fourth embodiment.

According to a seventh embodiment, an apparatus can include a configuring means that configures a split bearer. The split bearer is configured with a first data path between a user equipment and a first network node. The split bearer is also configured with a second data path between the user equipment and a second network node. The split bearer is configured for a switching operation. The switching operation comprises an operation where data transmission is restricted to be towards only one of the first data path and the second data path. The apparatus can also include first transmitting means that transmits on the split bearer towards the first data path. The apparatus can also include performing means that performs the switching operation. The transmitting towards the first data path is switched to transmitting towards the second data path. The apparatus can also include second transmitting means that transmits on the split bearer towards the second data path.

According to an eighth embodiment, an apparatus can include configuring means that configures a split bearer. The split bearer is configured with a first data path between a user equipment and a first network node. The split bearer is also configured with a second data path between the user equipment and a second network node. The split bearer is configured for a switching operation. The switching operation comprises an operation where data transmission is restricted to be towards only one of the first data path and the second data path. The apparatus can also include receiving means that receives transmissions on one of the first data path and the second data path. Transmissions are transmitted towards the other of the first data path and the second data path after the switching operation.

BRIEF DESCRIPTION OF THE DRAWINGS

For proper understanding of the invention, reference should be made to the accompanying drawings, wherein.

DETAILED DESCRIPTION

Certain embodiments of the present invention relate to implementing switching operations on split bearers. In particular, certain embodiments may relate to operations involving 3GPP New Radio Access Technologies (NR). Certain embodiments may also be related to the ongoing standardization efforts directed to performing split-bearer operations (in uplink) between LTE and WLAN. These ongoing standardization efforts are a part of the Release 14 work item on enhanced LTE-WLAN Aggregation (eLWA).

A split bearer is generally considered to be a radio bearer that is configured to a user equipment (UE), where the configuration of the bearer enables the UE to exchange data belonging to that bearer with at least two different base stations.

With LTE split bearers from Release 12 onwards, data can be exchanged with a master evolved Node B (eNB) and with a secondary evolved Node B (eNB).

Referring to 3GPP TS 36.300:

In DC, the radio protocol architecture that a particular bearer uses depends on how the bearer is setup. Three bearer types exist: MCG bearer, SCG bearer and split bearer. Those three bearer types are depicted on Figure 4.9.2-1 below. RRC is located in MeNB and SRBs are always configured as MCG bearer type and therefore only use the radio resources of the MeNB.

NOTE: DC can also be described as having at least one bearer configured to use radio resources provided by the SeNB.

Figure 1:
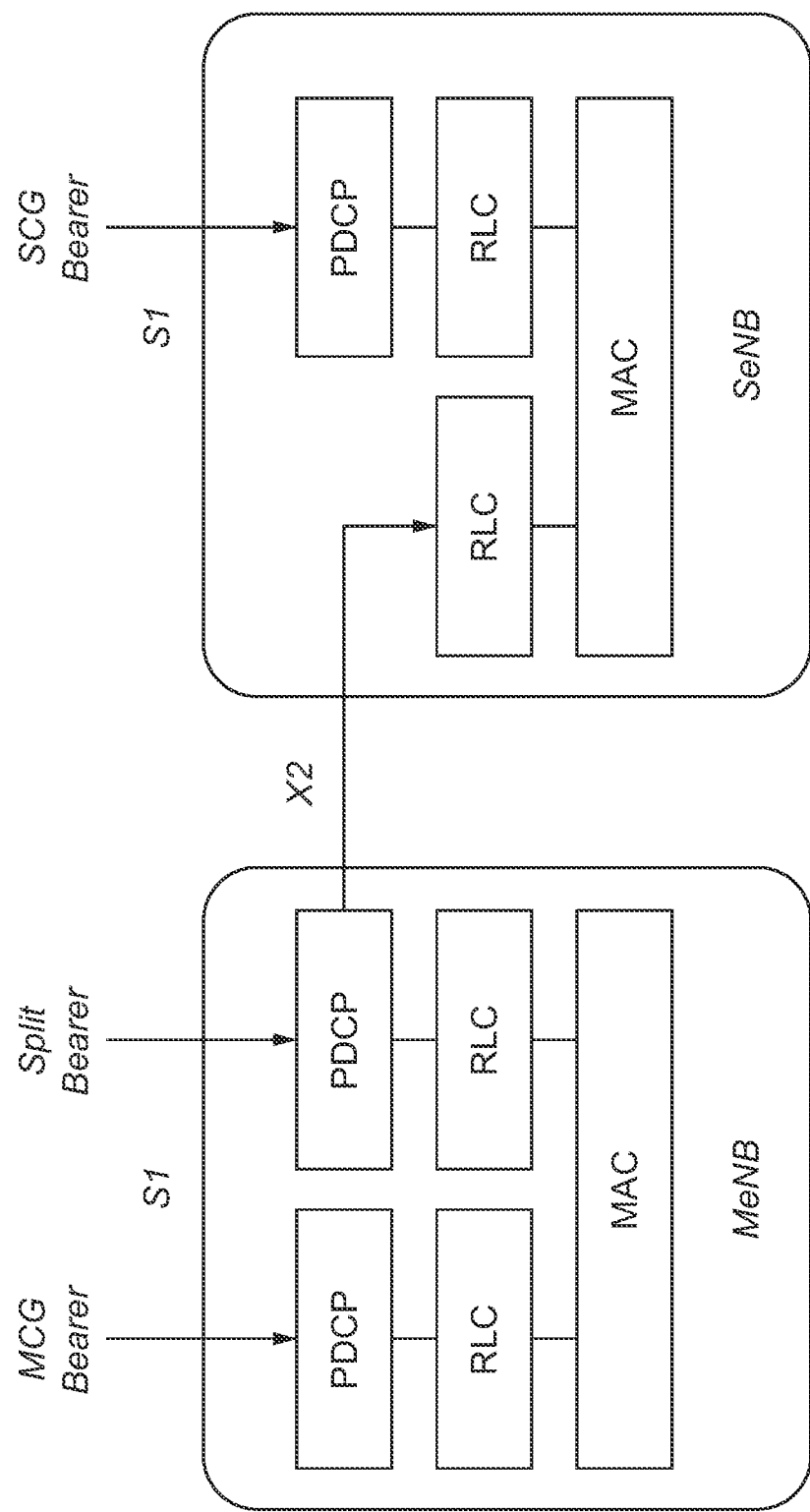
FIG. 1 illustrates a radio protocol architecture for dual connectivity, in accordance with certain embodiments of the present invention.

FIG. 1 illustrates a radio protocol architecture for LTE dual connectivity, in accordance with certain embodiments of the present invention. A Packet Data Convergence Protocol (PDCP) entity in an eNB (shown in the figure) can communicate with another PDCP entity, which typically resides in a user equipment (not shown). The PDCP entity communicating with a given PDCP entity is referred to as its peer entity.

With LWA bearers from Release 13 onwards, data can be exchanged with an LTE eNB and with a WLAN Access Point.

For the future, a tight interworking between LTE and NR technologies is being considered in 3GPP. With this tight interworking, a configuration of a bearer may enable a UE to exchange data belonging to that bearer with two base stations, where one of the base stations is an LTE eNB and the other base station is an NR base station.

The introduction of split bearers in Release 12 resulted in a reordering function in data-receiving operations of the Packet Data Convergence Protocol (PDCP) protocol (see section 5.1.2.1.4 in TS 36.323). PDCP Protocol Data Units (PDUs) with different sequence numbers can be received from different base stations, and are ordered. This is done by starting a reordering timer when a gap in the sequence of received PDU sequence numbers is observed. At expiry of the reordering timer, any PDUs still missing below (in terms of sequence number) the PDU whose reception started the timer are ignored in delivering SDUs to upper layers. As such, ordered delivery of data to upper protocol layers, such as TCP/IP, for example, can be implemented.

Split bearers can perform aggregation of data throughput that is obtained from both of the base stations. Switched operation on a split bearer refers to an operation where data transmission in a direction (uplink or downlink) is restricted towards one particular data path of the paths configured between the UE and the respective base stations, at any point in time. The intention in switched operation may be to use only one of the configured data paths at any point in time.

An example of switched operation on a split bearer includes LTE split bearers, as specified in Release 12, where uplink transmission by the PDCP, at the UE, was restricted to take place in a switched manner, as controlled by Radio Resource Control (RRC) (see section 4.5 in the Release 12 PDCP specification).

Another example of a switched operation on a split bearer includes a switched LWA bearer that is specified in Release 13, whose RRC configuration is no different from a split LWA bearer, but where the UE capability precludes simultaneous data reception over both LTE and WLAN.

With regard to implementing the above-described tight interworking between LTE and NR, certain doubts may exist regarding the usefulness of split bearers in aggregation (where the split bearers operate in a non-switched manner), because:

(1) if a connection point of the split bearer to the core network is the LTE eNB (i.e., a "LTE-anchored split bearer"), the bit rate of NR will need to traverse the LTE eNB. The bit rate of NR transmissions may be very high. Therefore, the route containing that LTE eNB may possibly become a bottleneck;

(2) if a connection point of the split bearer to the core network is an NR base station (i.e., a "NR-anchored split bearer"), then, because of the reordering performed at data reception, the high bit-rate of NR and the delays of the LTE radio interface may have a combined effect that results in massive buffer-size requirements.

In past 3GPP RAN2 contributions on LTE-NR tight interworking, it has been argued that LTE-NR split bearers will still be useful. It has been argued that LTR-NR splitting may be useful because of throughput aggregation, and because LTR-NR splitting will allow fast switching of the radio used in data transmission, as compared to the previous handover-like RRC procedures. One motivation for implementing LTE-NR split bearers is that, with the high-frequency bands where NR is foreseen to operate, the radio conditions can be volatile and can deteriorate very suddenly. Under such conditions, a configured split bearer would allow quick switching of the transmission between LTE and NR.

In view of the above, certain embodiments of the present invention are directed to performing switched operation on split bearers, when implementing a LTE-NR tight interworking. Certain embodiments may be used in eLWA.

Under both the existing precedents of switched operation on a split bearer (as described above), the reordering operation at PDCP is applicable. The reordering operation was deemed needed in handling a time period after a switch, during which PDUs may be received over both the base stations. For example, after a switching occurs, Radio Link Control (RLC) or Medium Access Control (MAC) retransmissions may still be underway on the previously-used link.

As described above, with NR, and with some of the newest 802.11 variants for WLAN, transmission paths can have very high data rates. When considering a switched operation on a split bearer, where the other transmission path has very high data rate, there are two problems with such handling.

First, the risk of excessive buffering requirements remains, even in switched operation on split bearers. As an example, consider the following possible chain of events:

(1) On a split bearer, PDCP transmits PDUs up to some Sequence number (SN)=N over LTE. PDCP then switches to transmit PDUs with SN>N over NR;

(2) At the peer PDCP entity, PDUs with SN>N are received over NR at a very high bit rate, while some PDU(s) with SN<(N+1) are still undergoing retransmissions on the LTE link.

As a result, the PDCP receiving the data may need to buffer data that is received over NR at the high rate, in order to perform reordering. The buffering may be for a duration that is based on the delays on the LTE radio interface. Therefore, with this example, the needed buffering may be in proportion to a bitrate-delay product with each factor being the maximum over LTE and NR.

Second, after a switch is performed from a poorly performing radio link to a very fast radio link, the rate of PDUs that are received over the fast link can be very high, meaning that also the rate of increase in the running Sequence Number in those PDUs can be high, while it can take considerable time to receive the PDUs that remained in transmission on the poorly performing link. Taking considerable time to receive the PDUs results in a risk of Hyper Frame Number (HFN) de-synchronization. With HFN de-synchronization, misinterpretation of the Most Significant Bits (MSBs) of the COUNT value associated with received PDUs may occur, because the SNs of those PDUs (i.e., the Least Significant Bits (LSBs) of the COUNT value) may appear in unexpected regions of the Packet Data Convergence Protocol-Sequence Number (PDCP-SN) space when they are received.

For reference purposes, the PDCP COUNT is defined as follows.

6.3.5 COUNT

Length: 32 bits

For ciphering and integrity a COUNT value is maintained. The COUNT value is composed of a HFN and the PDCP SN. The length of the PDCP SN is configured by upper layers.

Figure 2:
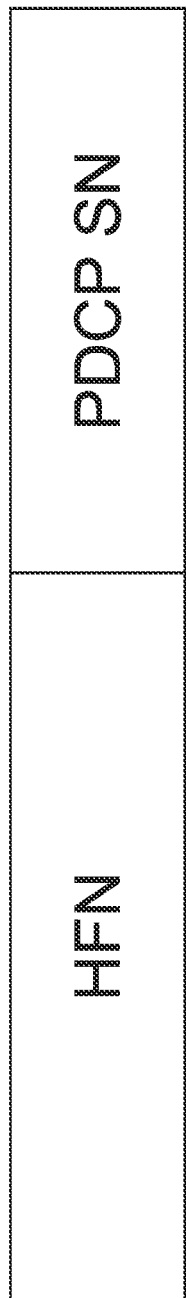
FIG. 2 illustrates a format of a COUNT, in accordance with certain embodiments of the present invention.

FIG. 2 illustrates a format of a COUNT, in accordance with certain embodiments of the present invention. The size of the HFN part in bits is equal to 32 minus the length of the PDCP SN.

NOTE: When performing comparison of values related to COUNT, the UE takes into account that COUNT is a 32-bit value, which may wrap around (e.g., COUNT value of $2^{32}-1$ is less than COUNT value of 0).

Certain embodiments of the present invention are directed to handling a split bearer that is configured for switching, as follows. Firstly, the PDCP reordering function may not be used at data reception. Rather, legacy Release 8 data-reception procedures as specified in section 5.1.2.1.2 of TS 36.323 can be used instead. That is, unless a PDU is received due to reset or re-establishment of the lower-layer protocol (typically the RLC protocol in case of PDCP), with a given SN of a received PDU, it is assumed that no PDUs with lower-numbered SNs will be received any more. As such, all the Service Data Units (SDUs) from PDUs with SNs up to the SN of the received PDU can be delivered to upper protocol layers, such as TCP/IP, for example.

Secondly, when a switch occurs (i.e., when there is a change in the data path that is used), PDCP may re-transmit PDUs on the newly-selected path. Retransmitting on the newly-selected path generally refers to re-transmitting over another radio interface that is configured for use by the split bearer. PDCP can re-transmit all PDUs starting from the first PDU for which confirmation of successful delivery has not been obtained. For example, confirmation of successful delivery may not have been received from lower layers (i.e., similar to the PDCP retransmissions performed at conventional LTE handover).

If the lower layers do not provide such confirmations of successful delivery, no retransmissions may be performed when switching. For example, if LTE RLC Unacknowledged mode (UM) is run, no retransmissions may be performed when switching. For example, only PDUs that have, so far, been untransmitted may be transmitted on the newly-selected path in this case.

As a result of the previous two items, the buffer-size requirement corresponds only to the maximum of the bitrate-delay products of the alternative data paths configured on the split bearer, as opposed to the worst-case product of the bit rate of one path and delay of the other data path.

When a switch is made, no disruption to lower-layer operations occurs. For example, there is no need to re-establish RLC entities.

With certain embodiments, a switch counter can be introduced, with the following properties.

Every PDCP PDU that is received can be associated with one value of the switch counter. As such, the associated counter value can be indicated in the header of each such PDU or, if the lower layers provide guaranteed in-sequence delivery (such as with current LTE RLC in Acknowledged mode (AM)), the counter value associated with a received Data PDU is the most recent counter value received on that same data path. For example, the counter value associated with a Data PDU can be the counter value in a PDCP Control PDU that is most recently received before the Data PDU.

At every switch, the switch counter can be incremented, and an indication of the new value can be sent in the first PDU that is then sent on the newly-selected path.

When receiving data PDUs from lower layers, data PDUs that are associated with a switch-counter value that is lower than the highest counter value that was received so far (over any data path) can be ignored and discarded Ignoring and discarding such data PDUs can eliminate the risk of Hyper Frame Number (HFN) de-synchronization, as described above.

After receiving an indication that a switch has occurred, such as, for example, when the switch-counter value is incremented, a PDCP status report (or a similar counterpart specified for NR) can be transmitted to the peer PDCP entity. This is an optional feature that can reduce unnecessary retransmissions after a switch.

Certain embodiments of the present invention address the above-described problems relating to switching on split-bearer operation, address the problems relating to excessive buffering requirements, and address the problems relating to risk of HFN de-synchronization due to reception of outdated PDUs. Certain embodiments may turn switching into a fast in-band operation, without the need to first exchange RRC messages to ensure alignment of both the endpoints of the radio bearer.

Figure 3:
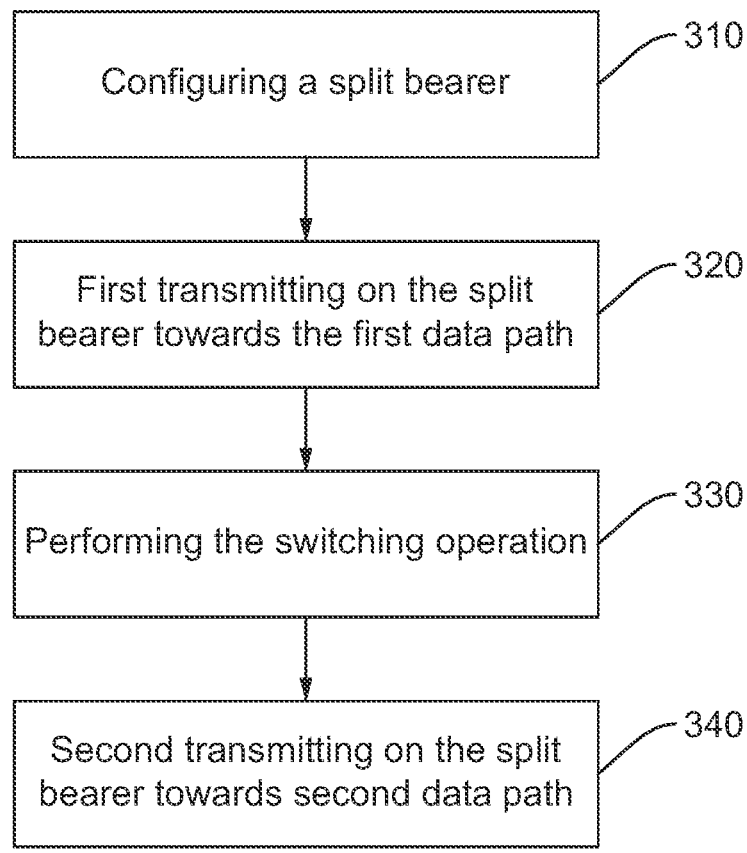
FIG. 3 illustrates a flowchart of a method in accordance with certain embodiments of the invention.

FIG. 3 illustrates a flowchart of a method in accordance with certain embodiments of the invention. The method may include, at 310, configuring a split bearer. The split bearer is configured with a first data path between a user equipment and a first network node. The split bearer is also configured with a second data path between the user equipment and a second network node. The split bearer is configured for a switching operation. The switching operation includes an operation where data transmission is restricted to be towards only one of the first data path and the second data path. The method can also include, at 320, first transmitting on the split bearer towards the first data path. The method can also include, at 330, performing the switching operation. The transmitting towards the first data path is switched to transmitting towards the second data path. The method can also include, at 340, second transmitting on the split bearer towards the second data path.

Figure 4:
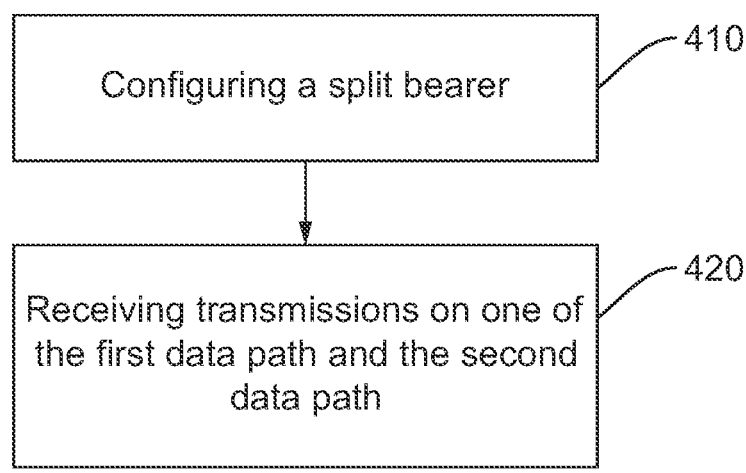
FIG. 4 illustrates a flowchart of a method in accordance with another embodiment of the invention.

FIG. 4 illustrates a flowchart of another method in accordance with certain embodiments of the invention. The method may include, at 410, configuring a split bearer. The split bearer is configured with a first data path between a user equipment and a first network node. The split bearer is also configured with a second data path between the user equipment and a second network node. The split bearer is configured for a switching operation. The switching operation includes an operation where data transmission is restricted to be towards only one of the first data path and the second data path at any given time. The method can also include, at 420, receiving transmissions on one of the first data path and the second data path, wherein transmissions are transmitted towards the other of the first data path and the second data path after the switching operation.

Figure 5:
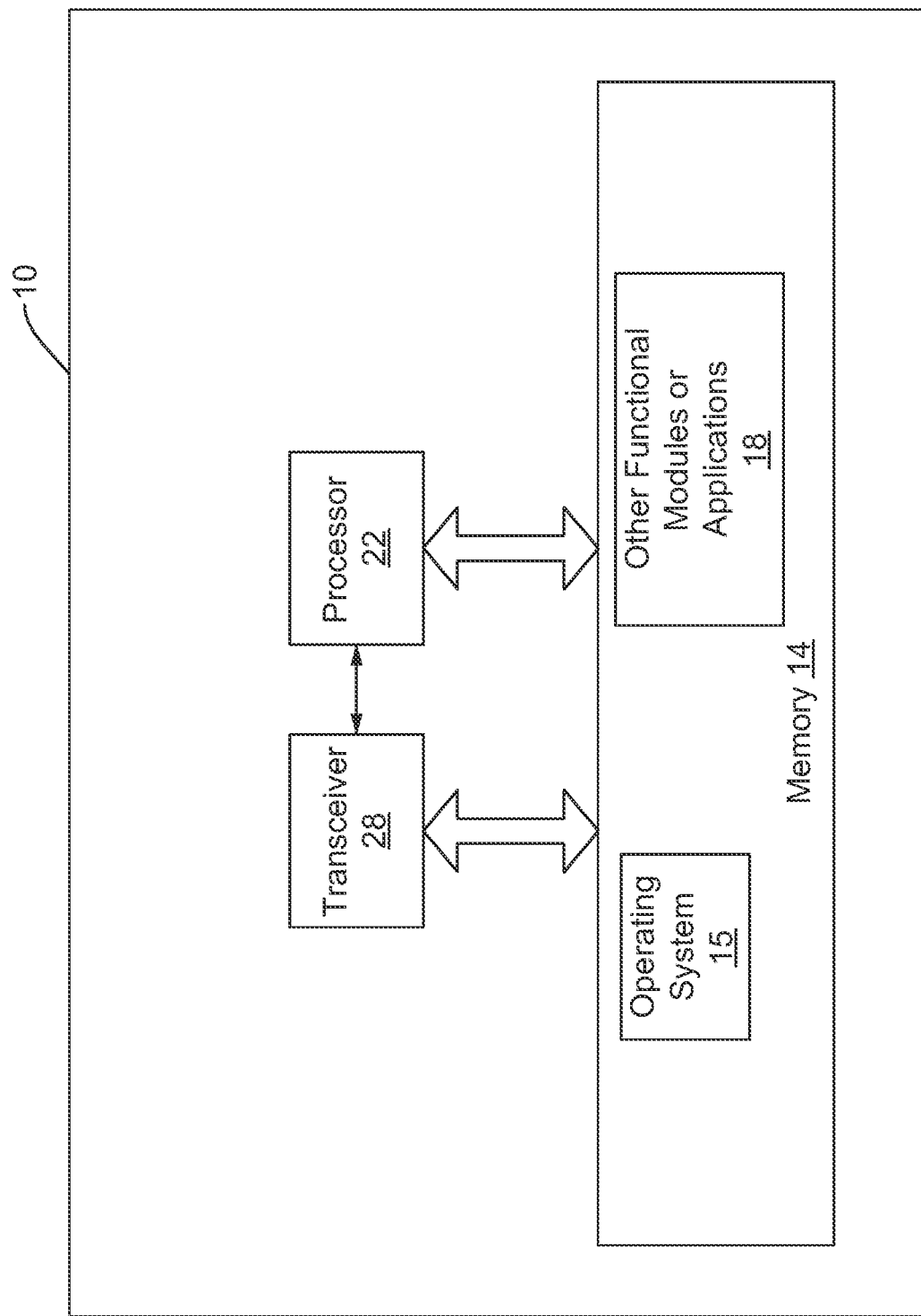
FIG. 5 illustrates an apparatus in accordance with certain embodiments of the invention.

FIG. 5 illustrates an apparatus in accordance with certain embodiments of the invention. In one embodiment, the apparatus can be a network node such as an evolved Node B and/or base station, for example. In another embodiment, the apparatus may correspond to a user equipment, for example. Apparatus 10 can include a processor 22 for processing information and executing instructions or operations. Processor 22 can be any type of general or specific purpose processor. While a single processor 22 is shown in FIG. 5, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 may include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 6:
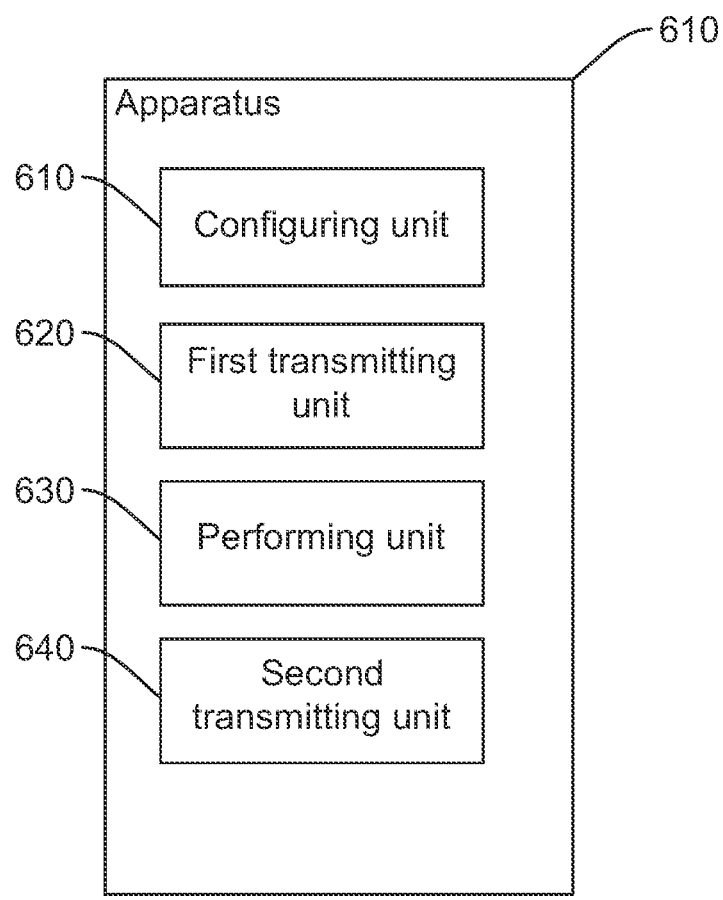
FIG. 6 illustrates an apparatus in accordance with certain embodiments of the invention.
Figure 7:
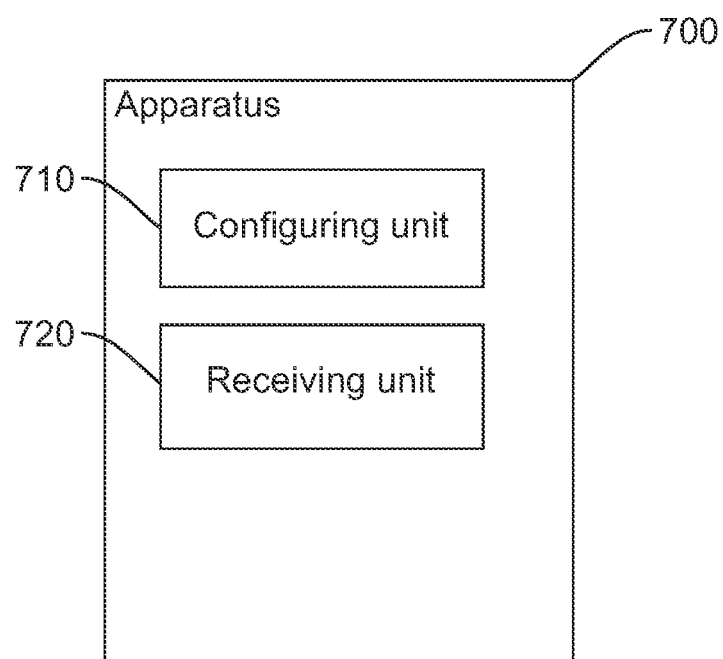
FIG. 7 illustrates an apparatus in accordance with certain other embodiments of the invention.

FIG. 6 illustrates an apparatus in accordance with certain embodiments of the invention. Apparatus 600 can be a user equipment, or a base station, and/or an evolved Node B, for example. Apparatus 600 can include a configuring unit 610 that configures a split bearer. The split bearer is configured with a first data path between a user equipment and a first network node. The split bearer is also configured with a second data path between the user equipment and a second network node. The split bearer is configured for a switching operation. The switching operation includes an operation where data transmission is restricted to be towards only one of the first data path and the second data path at any given time. Apparatus 600 also includes a first transmitting unit 620 that transmits on the split bearer towards the first data path. Apparatus 600 can also include a performing unit 630 that performs the switching operation, wherein the transmitting towards the first data path is switched to transmitting towards the second data path. Apparatus 600 can also include a second transmitting unit 640 that transmits on the split bearer towards the second data path. FIG. 7 illustrates an apparatus in accordance with certain embodiments of the invention. Apparatus 700 can be a user equipment, or base station, and/or an evolved Node B, for example. Apparatus 700 can include a configuring unit 710 that configures a split bearer. The split bearer is configured with a first data path between a user equipment and a first network node. The split bearer is also configured with a second data path between the user equipment and a second network node. The split bearer is configured for a switching operation. The switching operation includes an operation where data transmission is restricted to be towards only one of the first data path and the second data path at any given time. Apparatus 700 can also include a receiving unit 720 that receives transmissions on one of the first data path and the second data path. Transmissions are transmitted towards the other of the first data path and the second data path after the switching operation.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
    transmitting, by a user equipment, one or more protocol data units for data transmission on a radio bearer using a first data path, wherein the radio bearer is configured with the first data path between the user equipment and a first network node, and the radio bearer is also configured with a second data path between the user equipment and a second network node, and wherein the radio bearer is configured for a switching operation where a data transmission is restricted to using one of the first data path and the second data path;
    performing, by the user equipment, the switching operation to switch the first data path for the data transmission to the second data path; and
    retransmitting, by the user equipment, a protocol data unit for which a confirmation of a successful transmission was not obtained on the radio bearer using the second data path, wherein the retransmitted protocol data unit corresponds to one of the one or more protocol data unit.

2. The method according to claim 1, wherein each of the one or more protocol data units is transmitted with a corresponding sequence number.

3. The method according to claim 1, wherein the transmitting and the retransmitting are performed by a protocol data unit entity of the user equipment.

4. The method according to claim 1, wherein the retransmitting includes transmitting a corresponding switch counter value, and the switch counter value is incremented each time the switching operation is performed.

5. The method according to claim 1, wherein the switching operation is controlled by a radio resource control configuration.

6. An apparatus, comprising:
    at least one processor; and
    at least one memory including computer program code, the at least one memory and the computer program code are configured, with the at least one processor, to cause the apparatus at least to:

transmit one or more protocol data units for the data transmission on a radio bearer using a first data path, wherein the radio bearer is configured with the first data path between the apparatus and a first network node, and the radio bearer is also configured with a second data path between the apparatus and a second network node, and wherein the radio bearer is configured for a switching operation where a data transmission is restricted to using one of the first data path and the second data path;

perform the switching operation to switch the first data path for the data transmission to the second data path; and retransmit a protocol data unit for which a confirmation of a successful transmission was not obtained on the radio bearer using the second data path, wherein the retransmitted protocol data unit corresponds to one of the one or more protocol data units.

7. The apparatus according to claim 6, wherein each of the one or more protocol data units is transmitted with a corresponding sequence number.

8. The apparatus according to claim 6, wherein the data transmission are performed by a protocol data unit entity of the user equipment.

9. The apparatus according to claim 6, wherein the retransmitting includes transmitting a corresponding switch counter value, and the switch counter value is incremented each time the switching operation is performed.

10. The apparatus according to claim 6, wherein the switching operation is controlled by a radio resource control configuration.

11. A computer program product embodied on a non-transitory computer readable medium, the computer program product configured to control a processor to perform:

transmitting, by a user equipment, one or more protocol data units for data transmission on a radio bearer using a first data path, wherein the radio bearer is configured with the first data path between the user equipment and a first network node, and the radio bearer is also configured with a second data path between the user equipment and a second network node, and wherein the radio bearer is configured for a switching operation where a data transmission is restricted to using one of the first data path and the second data path;

performing, by the user equipment, the switching operation to switch the first data path for the data transmission to the second data path; and retransmitting, by the user equipment, a protocol data unit for which a confirmation of a successful transmission was not obtained on the radio bearer using the second data path, wherein the retransmitted protocol data unit corresponds to one of the one or more protocol data units.

12. The computer program product according to claim 11, wherein each of the one or more protocol data units is transmitted with a corresponding sequence number.

13. The computer program product according to claim 11, wherein the transmitting and the retransmitting are performed by a protocol data unit entity of the user equipment.

14. The computer program product according to claim 11, wherein the switching operation is controlled by a radio resource control configuration.

15. The computer program product according to claim 11, wherein the retransmitting includes transmitting a corresponding switch counter value, and the switch counter value is incremented each time the switching operation is performed.

* * * * *